US006580987B2

(12) United States Patent
Sadano et al.

(10) Patent No.: US 6,580,987 B2
(45) Date of Patent: Jun. 17, 2003

(54) DRIVER ASSISTANCE SYSTEM FOR A VEHICLE

(75) Inventors: On Sadano, Kanagawa (JP); Hiroshi Kawazoe, Kanagawa (JP); Masayasu Shimakage, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/961,239

(22) Filed: Sep. 25, 2001

(65) Prior Publication Data

US 2002/0040265 A1 Apr. 4, 2002

(30) Foreign Application Priority Data

Oct. 2, 2000 (JP) ........................................ 2000-301818

(51) Int. Cl.$^7$ ............................ B62D 15/00; B62D 1/28; B62D 6/00
(52) U.S. Cl. .......................................... 701/41; 348/119
(58) Field of Search ............................... 701/41, 28, 23; 348/118, 119; 342/71; 180/168

(56) References Cited

U.S. PATENT DOCUMENTS

| 5,765,116 | A | * | 6/1998 | Wilson-Jones et al. | ....... 701/41 |
| 6,473,678 | B1 | * | 10/2002 | Satoh et al. | ................. 701/41 |
| 2002/0026267 | A1 | * | 2/2002 | Kifuku | ....................... 701/41 |

OTHER PUBLICATIONS

H. Mouri, "Study of Automatic Path Tracking Control by Considering Vehicle Dynamics", *Doctorial Paper* Issued by Tokyo Noukou University, pp. 26–78, (Mar., 2001), No translation.

M. Shimakage et al., "Design of Lane–keeping Control with Steering Torque Input for a Lane–Keeping Assistance System", *Steering and Suspension Technology Symposium 2001*, pp. 1–8, (Mar. 5–8, 2001).

* cited by examiner

*Primary Examiner*—Michael J. Zanelli
(74) *Attorney, Agent, or Firm*—Foley & Lardner (57) ABSTRACT

A driver assistance system (10) assists the driver in controlling the direction of a moving vehicle along a contrived centerline between lane markings by regulating a steering bias applied to a steering system of the vehicle. An electric motor (22) coupled to the steering mechanism provides a torque input to the steering in response to an estimate of electric current provided by an observer. The observer has a friction term matrix element ($a_{55}$), which is correlated with friction in the steering mechanism. A controller (24) is provided, which establishes a desired or ideal frequency function of lateral displacement data (102), samples lateral displacement to provide a real frequency function of lateral displacement data (104), compares the real frequency function with the ideal frequency function (106), and updates or leaves unaltered the friction term ($a_{55}$) based on the result of comparison.

7 Claims, 8 Drawing Sheets

DRIVER ASSISTANCE SYSTEM FOR A VEHICLE

BACKGROUND OF THE INVENTION

The present invention relates to a driver assistance system for a vehicle adapted to assist the driver in controlling the direction of a moving vehicle along a predetermined path.

Lane following systems have been demonstrated operating at motorway speeds. Such systems certainly prevent lane departure while lane markings are present. According to a known system, a contrived centerline between lane markings of a road is tracked and a steering bias is applied to a steering system of a vehicle in such a manner as to assist the driver in tracking the contrived centerline position. The contrived centerline may be a true centerline between lane markings, for example on a motorway, or may be offset from the true centerline to facilitate the negotiation of curves. The steering bias is a torque input to the steering, which may either assist or oppose the steering torque from the driver. A camera or equivalent sensor is mounted on the vehicle and used to detect the lane markings on the road. An associated signal processor estimates the vehicle's lateral position in relation to the lane markings. The vehicle's lateral position may be a vehicle's lateral displacement from the contrived centerline or from a boundary of a lane defined by the line markings. An actuator, which may take the form of an electric motor, coupled to the steering mechanism is used to provide a torque input to the steering. The processor is designed to assist the driver to maintain the vehicle's lane position by preventing lane departure using a biasing torque.

SUMMARY OF THE INVENTION

The steering mechanism has friction that affects a ratio between the ampere of electric current input passing through the electric motor and the magnitude of torque output, which may be used as a steering bias. The greater the friction, the less the torque is. With the same ampere of electric current, variation in friction, which may be found even among production units of a steering mechanism of the same type may cause variation in torque used as steering bias. In a production unit of steering mechanism, friction is not constant over the whole period of its service life. Usually, friction drops after extended period of use. Accordingly, a need remains to adjust or regulate the ampere of electric current to provide torque acceptable by a driver against variation in friction in steering mechanism. Initial adjustment of setting of gain on product-by-product basis and/or the subsequent readjustment in each product would be required due to difficulties in achieving adaptive control of gain needed to cope with friction in steering mechanism.

It is therefore an object of the present invention to provide a method or a system for assisting a driver in tracking a contrived centerline between lane markings on a road, which does not require initial adjustment on product-by-product basis to cope with variation in friction in steering mechanism and the subsequent readjustment in each product.

According to one aspect of the present invention, there is provided a method of assisting a driver of a vehicle in tracking a contrived centerline between lane markings defining a lane boundary on a road by applying a steering bias to a steering system of the vehicle, the steering system being provided with an actuator, which provides the steering bias in response to an estimate produced by an observer that has a friction term correlated with friction in the steering system, the method comprising:

establishing an ideal frequency function of lateral displacement data;

sampling lateral displacement of the vehicle in relation to the lane markings to provide a real frequency function of lateral displacement data;

comparing the real frequency function with the ideal frequency function; and updating or leaving unaltered the friction term based on the result of comparison.

According to another aspect of the present invention, there is provided a driver assistance system for a vehicle adapted to assist a driver in tracking a contrived centerline between lane markings defining a lane boundary on a road by applying a steering bias to a steering system of the vehicle, the steering system being provided with an actuator, which provides the steering bias in response to an estimate produced by an observer that has a friction term correlated with friction in the steering system, the system comprising:

a lane recognition unit providing a lateral displacement of the vehicle in relation to the lane markings; and a controller;

a computer readable storage media having data representing instructions executable by the controller, the computer readable storage media having:

instructions for establishing an ideal frequency function of lateral displacement data;

instructions for sampling the lateral displacement of the vehicle in relation to the lane markings to provide a real frequency function of lateral displacement data;

instructions for comparing the real frequency function with the ideal frequency function; and instructions for updating or leaving unaltered the friction term based on the result of comparison.

BRIEF DESCRIPTION OF THE DRAWINGS

Further objects and advantages of the invention will be apparent from reading of the following description in conjunction with the accompanying drawings.

DESCRIPTION OF THE PREFERRED EMBODIMENT

Figure 1:
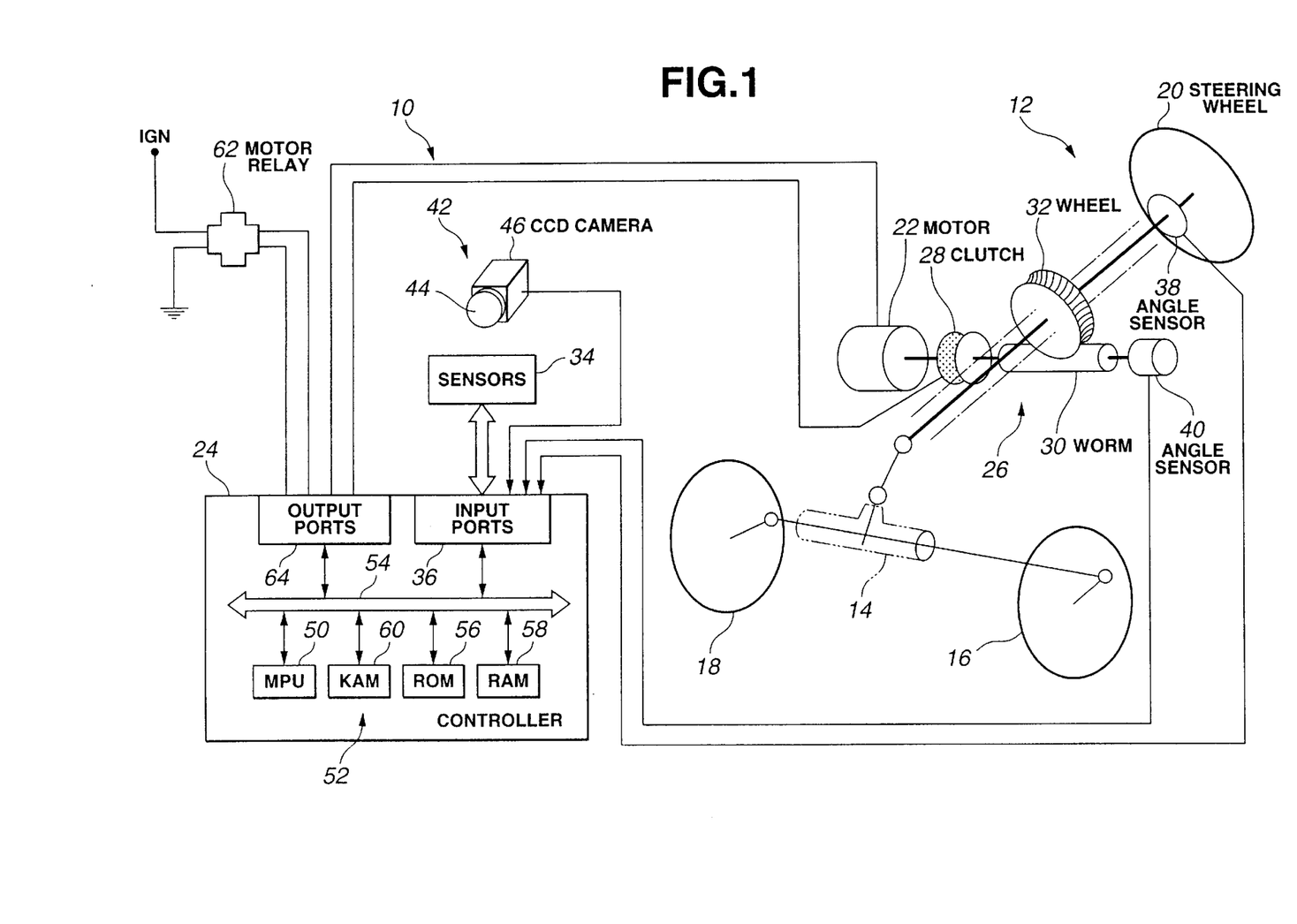
FIG. 1 is a block diagram of a preferred embodiment.

Referring now to FIG. 1, a system for assisting a driver in following a contrived centerline is shown. The driver assistance system, generally indicated by reference numeral 10, is adapted for use with a conventional steering system 12 of a wheeled motor vehicle. As illustrated, the steering system 12 comprises a hydraulic power-assist steering (P/S) unit 14 for controlling the steering position of front wheels 16 and 18 of vehicle in response to manual operation of a steering wheel 20. An actuator in the form of an electric motor 22 is adapted to provide servo or power assistance to augment the steering effort applied to the P/S unit 14 from the steering wheel 20 in response to energizing current regulated by a command from a controller 24. Motor 22 is coupled to the steering mechanism through a gearbox 26 and an electromagnetic clutch 28 which may be omitted from certain installations. Gearbox 26 includes a worm 30 and a wheel 32, in this example.

Driver assistance system 10 may also include various sensors 34 for generating signals indicative of corresponding operational conditions or parameters of the vehicle engine (not shown), the vehicle transmission (not shown), and other vehicular components. Sensors 34 are in electrical communication with controller 24 via input ports 36.

Steering system 12 is provided with a steering wheel angle sensor 38 for generating a signal indicative of an angular position of steering wheel 20. Gearbox 26 is provided with an angle sensor 40 for generating a signal indicative of an angular position of worm 30. Sensors 38 and 40 are in electrical communication with controller 24 via input ports 36.

The vehicle is provided with a lane recognition unit 42. Lane recognition unit 42 includes a camera 44, which is mounted on the vehicle, for example in the middle of the bonnet or grille, or in the vicinity of the internal rear-view mirror in order to detect the presence of lane markings on a road, for example the spaced white or yellow lines defining a lane of a motor way. Camera 44 may be "light-sensitive" or the "infrared" sensing type. In a preferred embodiment, camera 44 is a charge-coupled-device (CCD) camera. Lane recognition unit 42 also includes a signal image processor 46. In response to signals from CCD camera 44, image processor 46 estimates the lateral position of the vehicle in relation to the lane markings. The lateral position of the vehicle may be represented by a lateral displacement from lane markings on one edge of a lane or a lateral displacement from the contrived centerline position between lane markings. In the preferred embodiment, the lateral displacement from the contrived centerline is used to represent the lateral position of the vehicle in relation to lane markings. Corresponding signals from image processor 46 are fed into controller 24 via input ports 36.

Controller 24 preferably includes a microprocessor 50 in communication with various computer readable storage media 52 via data and control bus 54. Computer readable storage media 52 may include any one of a number of known devices, which function as a read-only memory (ROM) 56, random access memory (RAM) 58, keep-alive memory (KAM) 60, and the like. The computer readable storage media may be implemented by any one of a number of known devices capable of storing data representing instructions executable via a computer such as controller 24. Known devices may include, but are not limited to, PROM, EPROM, EEPROM, flash memory, and the like in addition to magnetic, optical, and combination media capable of temporary or permanent data storage.

Computer readable storage media 52 include various program instructions, software, and control logic to control motor 22 and clutch 28. Controller 24 receives signals from sensors 34, 38, and 40 via input ports 36 and generates output signals, which may be applied to a driver circuit (not shown), including a motor relay 62, for motor 22 and a driver circuit (not shown) for clutch 28, via output ports 64.

In operation, controller 24 responds to signals from image processor 46 and produces an output signal, which may be called a steering bias torque command, indicative of the ampere of electric current to pass through motor 22 to provide, in turn, an appropriate bias to steering system 12 depending upon the lateral displacement from its contrived centerline position. Controller 24 has an observer including a model, which takes into account friction in the steering mechanism. The observer produces an estimate of the ampere of electric current, which is to pass through motor 22.

The steering bias applied by system 10 can be switched on and off through the driver interface (not shown). In addition, system 10 is automatically disabled temporarily when a direction indicator is operated to indicate that the vehicle is moving out of the lane.

The provision of clutch 28 has the advantage of improving the feel by disengaging motor 22 when no lane following assistance is required.

As mentioned before, the observer estimates the ampere of electric current to pass through motor 22. The model used in the observer takes into account friction in the steering mechanism and has a friction term correlated with the friction. Lateral displacement is provided as an input to the observer. In a preferred embodiment, the friction term is updated to cope with variation of friction in the steering mechanism.

Figure 2:
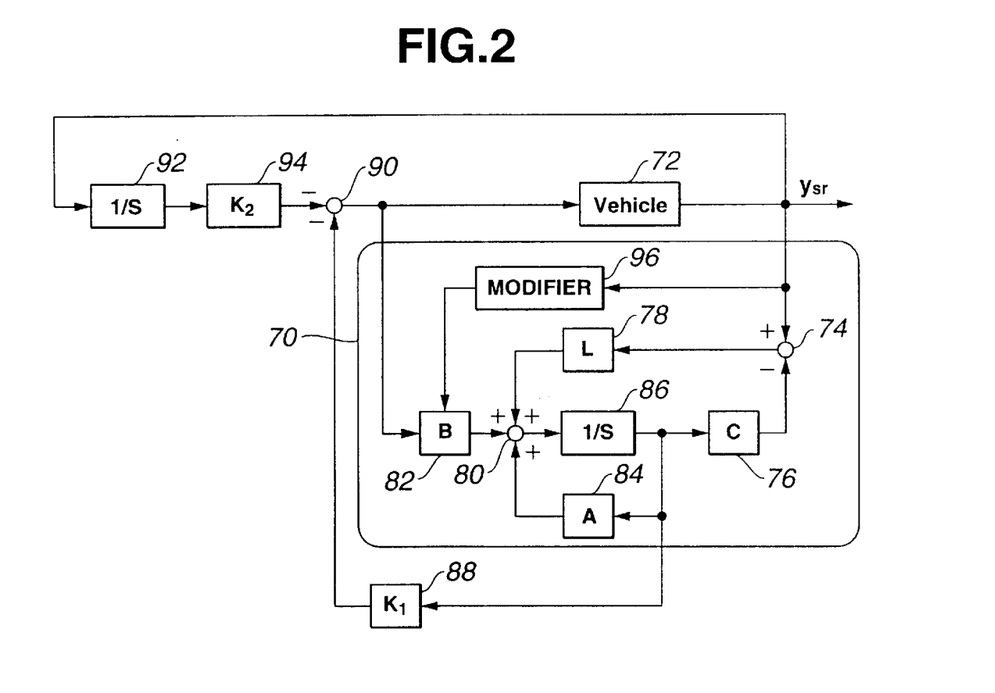
FIG. 2 is a block diagram of an observer.

With reference to FIG. 2, the observer, generally indicated by reference numeral 70, is bounded by a corner-rounded rectangle. Vehicle's lateral displacement $Y_{sr}$ from one boundary of a lane is provided as an input to observer 70 as well as the ampere of electric current i applied to vehicle illustrated as block 72. At a summation point 74, lateral displacement $y_{sr}$ is subtracted by the result of calculation, at block 76, of an equation of state C. The result of subtraction at summation point 74 is provided as an input to an observer gain L generator illustrated as block 78. Gain L generated at block 78 is fed to a summation point 80. Also fed to this summation point 80 as inputs are the result of calculation, at block 82, of an equation of state B, and the result of calculation, at block 84, of an equation of state A. The electric current i is provided as an input to block 82. The equation of state B at block 82 includes a friction term $a_{55}$, which takes into account friction in the steering mechanism. The result of calculation of equation of state B at block 82 is supplied to summation point 80. The result of calculation of equation of state A at block 84 is supplied to summation point 80. At summation point 80, the results from blocks 82, 84 and gain from block 78 are added to each other. The result is supplied from summation point 80 to an integral circuit 86. The result from integral circuit 86 is supplied as an input to block 76, and also to block 84. The result from integral circuit 86 is provided as an output of observer 70. The output is multiplied with a gain K1 at block 88 and supplied to a summation point 90.

Lateral displacement $Y_{sr}$ is fed back to an integral circuit 92. The result from integral circuit 92 is multiplied with a gain K2 at block 94 and supplied to summation point 90. At summation point 90, sum of two inputs is calculated. The result from summation point 90 is supplied as an input to vehicle 72.

In a preferred embodiment, lateral displacement $Y_{sr}$ is sampled at a modifier block 96. At block 96, a correction value or coefficient to the friction term is determined based on a frequency function of the samples. Friction term $a_{55}$ is updated using the correction coefficient.

Figure 3:
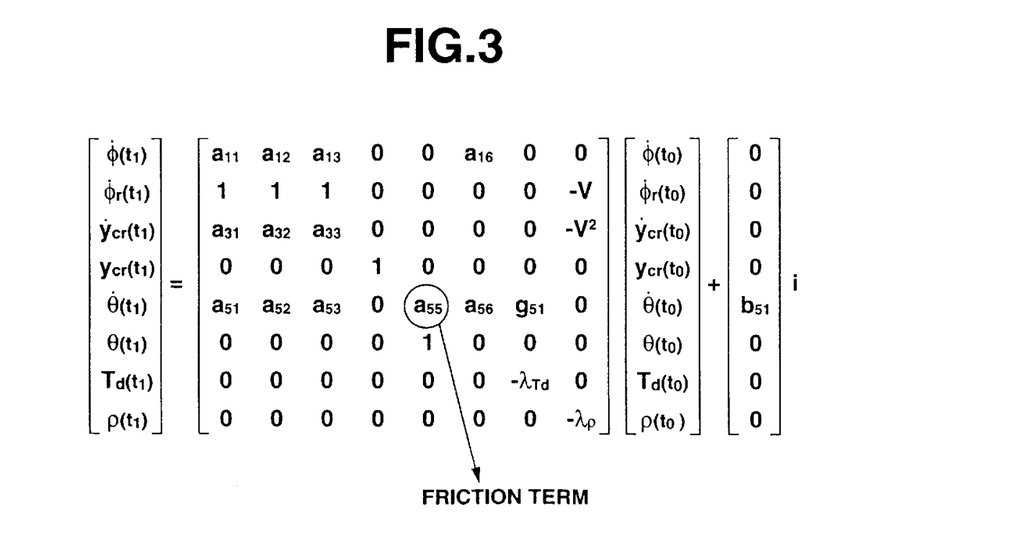
FIG. 3 is a mathematical representation of a model taking into account friction in a steering mechanism.

With reference to FIG. 3, an equation used for calculation within observer 70 is illustrated. According to this equation, a sum of a product of a 8×8 matrix with a state vector at an initial time $t_0$ and a product of electric current i with a column vector gives the state vector at a later time $t_1$. In the column vector, $b_{S1}$ represents a gain. The state vector at $t_0$ is a column vector whose components are eight (8) state variables. The state variables are yaw rate ($\dot{\phi}$), yaw angle with respect to the contrived centerline ($\phi_r$), lateral velocity with respect to the contrived centerline ($\dot{y}_{cr}$), lateral displacement of center of gravity with respect to the contrived centerline ($y_{cr}$), steer angle rate ($\dot{\theta}$), steer angle ($\theta$), external disturbance torque $T_d$, and road curvature ($\rho$). In the 8×8 matrix, the reference character $a_{55}$ represents a friction term matrix element, which is correlated with friction in the steering mechanism.

In a preferred embodiment, the friction term matrix element $a_{55}$ is modified or updated to cope with varying friction in the steering mechanism.

Figure 4:
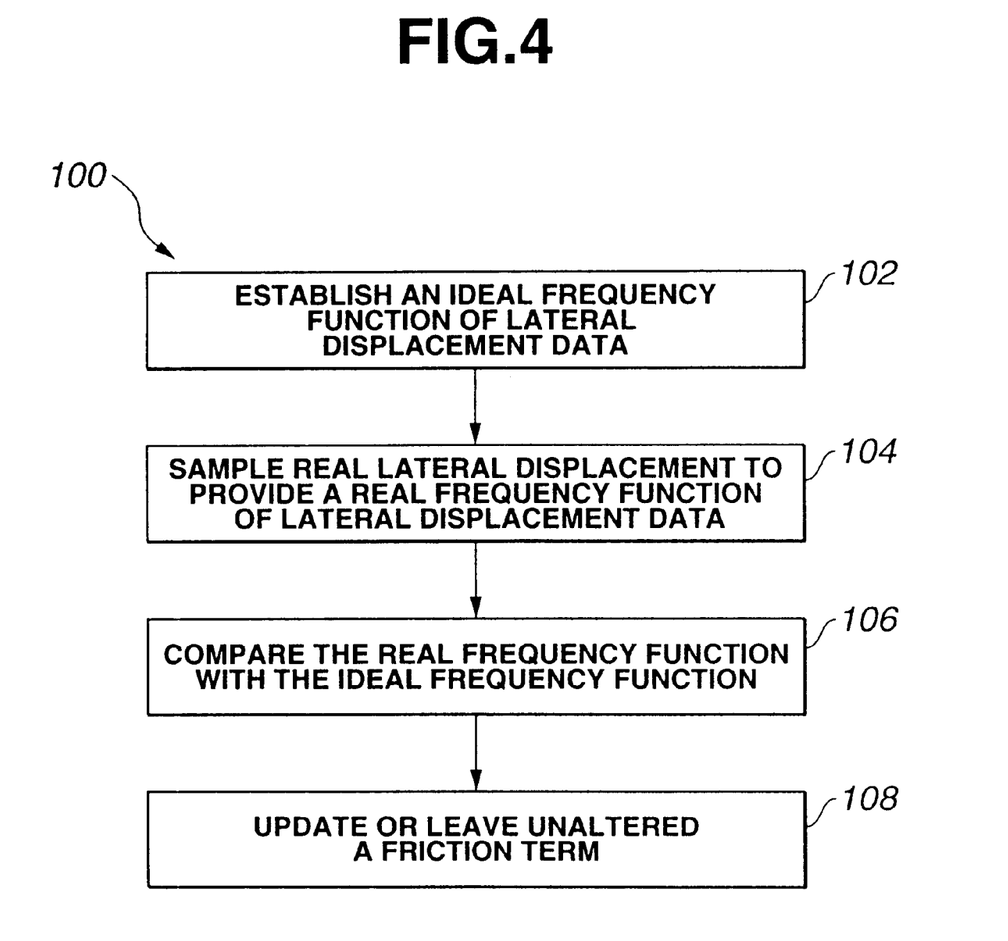
FIG. 4 is a block diagram illustrating a method of the present invention for controlling a friction term in the model.

Referring to FIG. 4, a method of the present invention for controlling friction term $a_{55}$ is generally indicated at 100. At block 102, an ideal frequency function of lateral displacement data is established. Block 104 samples a real lateral displacement to provide a real frequency distribution of lateral displacement data. Block 106 compares the real frequency function with the ideal frequency function. Block 108 updates or leave unaltered a friction term $a_{55}$ based on the result of comparison at block 106.

Figure 5:
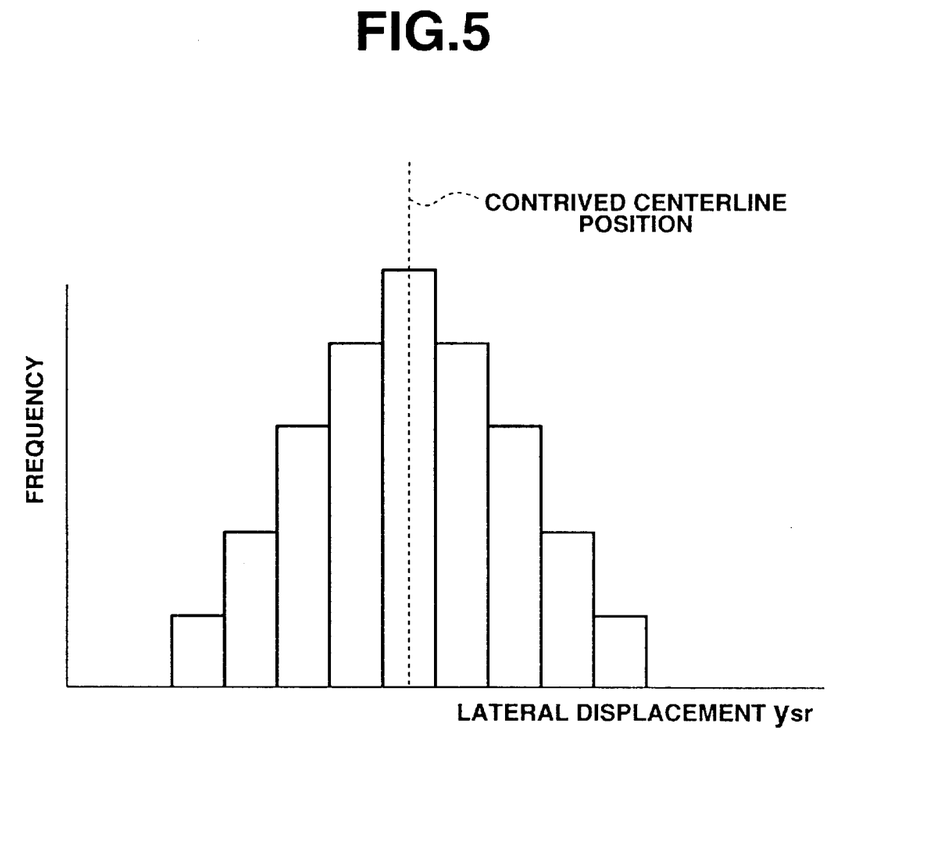
FIG. 5 is a histogram illustrating a desired or ideal frequency function of lateral displacement data.

FIG. 5 is a histogram illustrating the ideal frequency function of lateral displacement data, which is a graphical representation in which rectangles are use to portray the lateral displacement data, with the bases of the rectangles representing class intervals and their heights representing the corresponding class frequencies.

Figure 6:
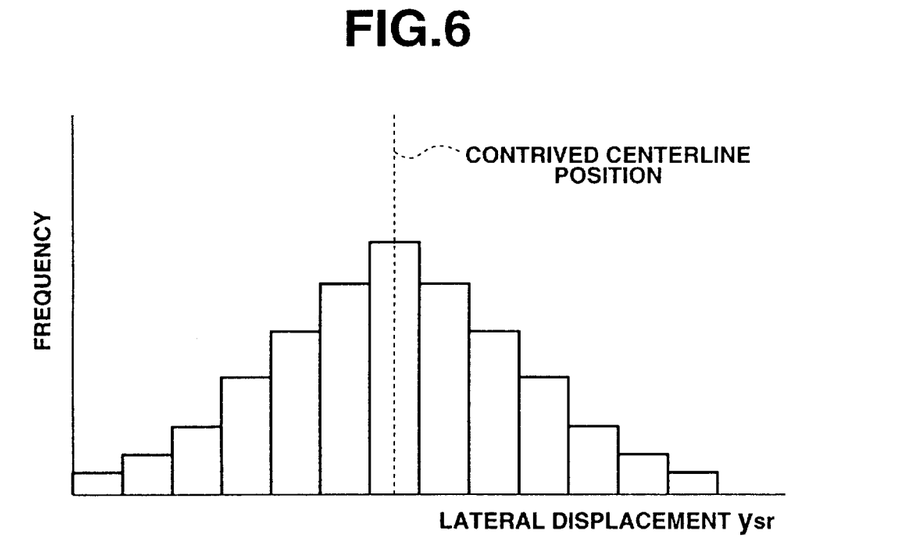
FIG. 6 is a histogram illustrating a real frequency function of sampled lateral displacement data, which may be observed when the variance is great.

FIG. 6 is a histogram illustrating a frequency function of sampled lateral displacement data, which may be observed when the variance is great.

Figure 7:
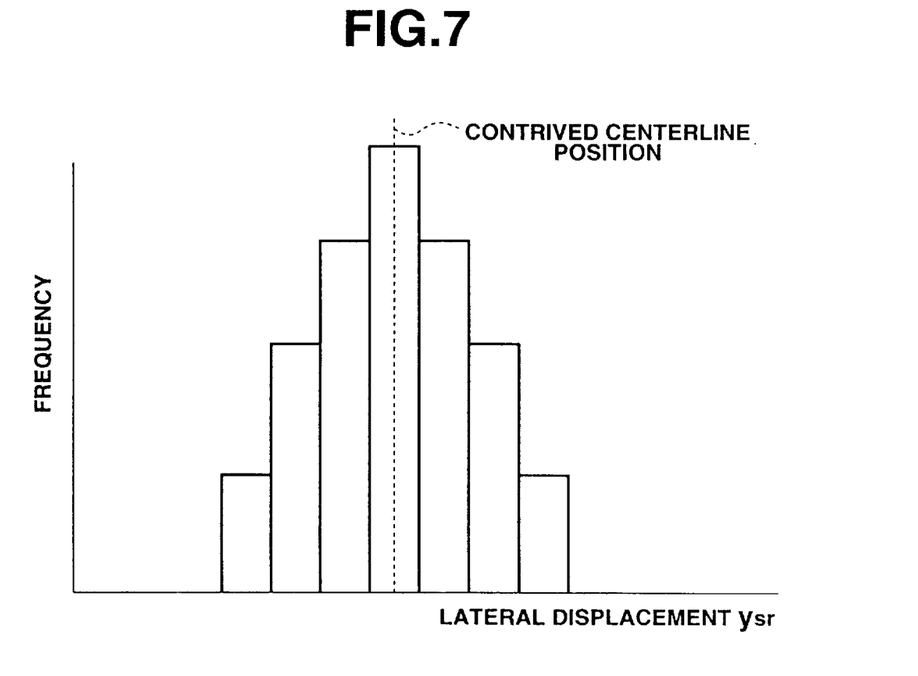
FIG. 7 is a histogram illustrating a real frequency function of sampled lateral displacement data, which may be observed when the variance is small.

FIG. 7 is a histogram illustrating a frequency function of sampled lateral displacement data, which may be observed when the variance is small.

In the case where the sampled lateral displacement data distribute more as shown in FIG. 6 than the ideal distribution as shown in FIG. 5, it is determined that a present value of friction in the steering mechanism is greater than that estimated by a model value of friction term. Thus, the value of friction term needs to be increased.

In the case where the sampled lateral displacement data distribute less as shown in FIG. 7 than the ideal data distribution as shown in FIG. 5, it is determined that a present value of friction in the steering mechanism is less than that estimated by a model value of friction term. Thus, the value of friction term needs to be decreased.

In the above-mentioned manner, it is determined whether or not a present value of friction in the steering mechanism is greater than or less than that estimated by a model value of friction term based on the result of comparison of the rear frequency function of sampled lateral displacement data with the ideal frequency function.

If any one or ones of components of the steering mechanism provide values of friction greater than their designed levels, a desired great torque cannot be expected based on a value of electric current estimated by the observer. This is the case where the friction in the steering mechanism is greater than that estimated by the model value of friction term in the observer. In this case, a gain is low for the steering bias to automatically return the vehicle back onto the contrived centerline position.

If any one or ones of components of the steering mechanism provide values of friction less than their designed levels and/or the friction in the steering mechanism drops due to extended period of use, a desired small torque cannot be expected based on a value of electric current estimated by the observer. This is the case where the friction in the steering mechanism is less than that estimated by the model value of friction term in the observer. In this case, a gain is high for the steering bias to automatically return the vehicle back onto the contrived centerline position.

Such discrepancy can be eliminated by modifying or updating friction term of the observer based on the result of comparison of the real frequency function of sampled lateral displacement (see FIG. 6 or 7) with the ideal frequency function (see FIG. 5).

Figure 8:
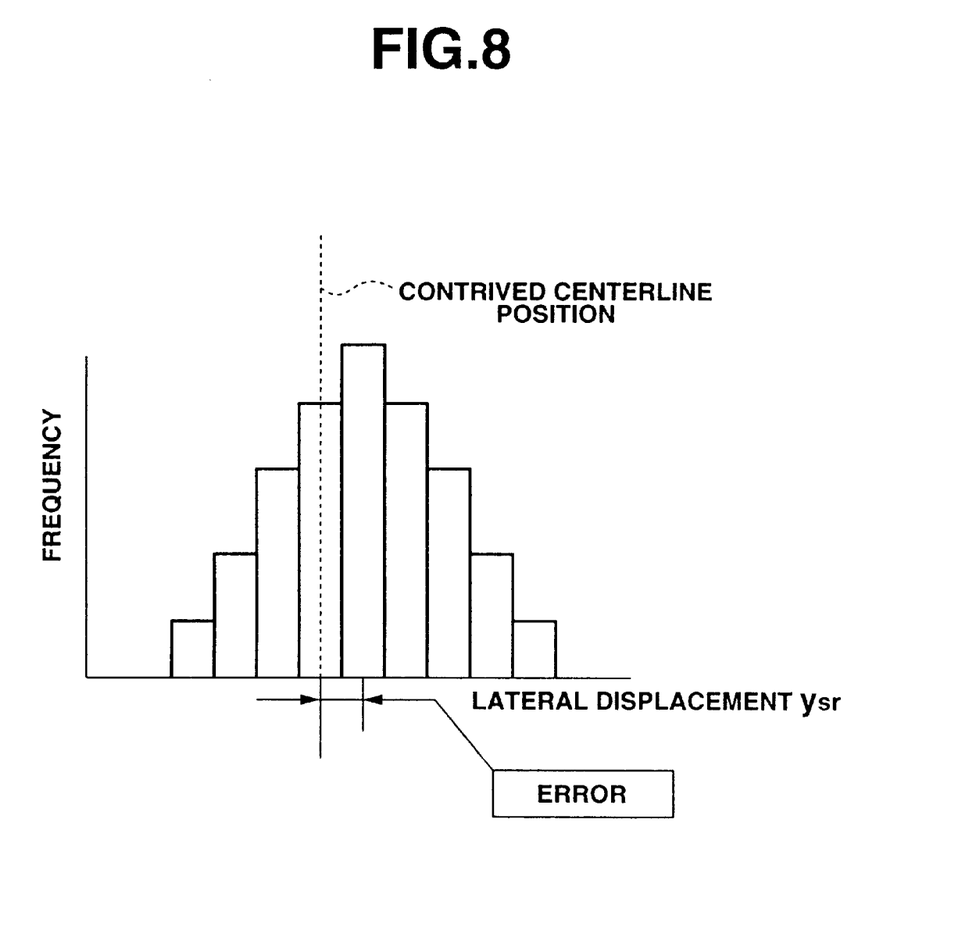
FIG. 8 is a histogram of illustrating a real frequency function of sampled lateral displacement data, which may be observed when there is a standing error between the contrived centerline position and the midpoint of class interval with the highest frequency.

With reference to FIG. 8, an error between the contrived centerline position and the midpoint of class interval with the highest frequency may be derived from a discrepancy between a neutral position of the steering wheel 20 and a neutral position of the steering angle sensor 38 or a discrepancy between the designed mount site and the actual mount site of CCD camera 44. In a preferred embodiment, this error is calculated for correcting lateral displacement data used as input to the observer. Accordingly, the observer can provide an accurate estimate of electric current in any circumstances including the availability of discrepancies causing the error illustrated in FIG. 8.

Figure 9:
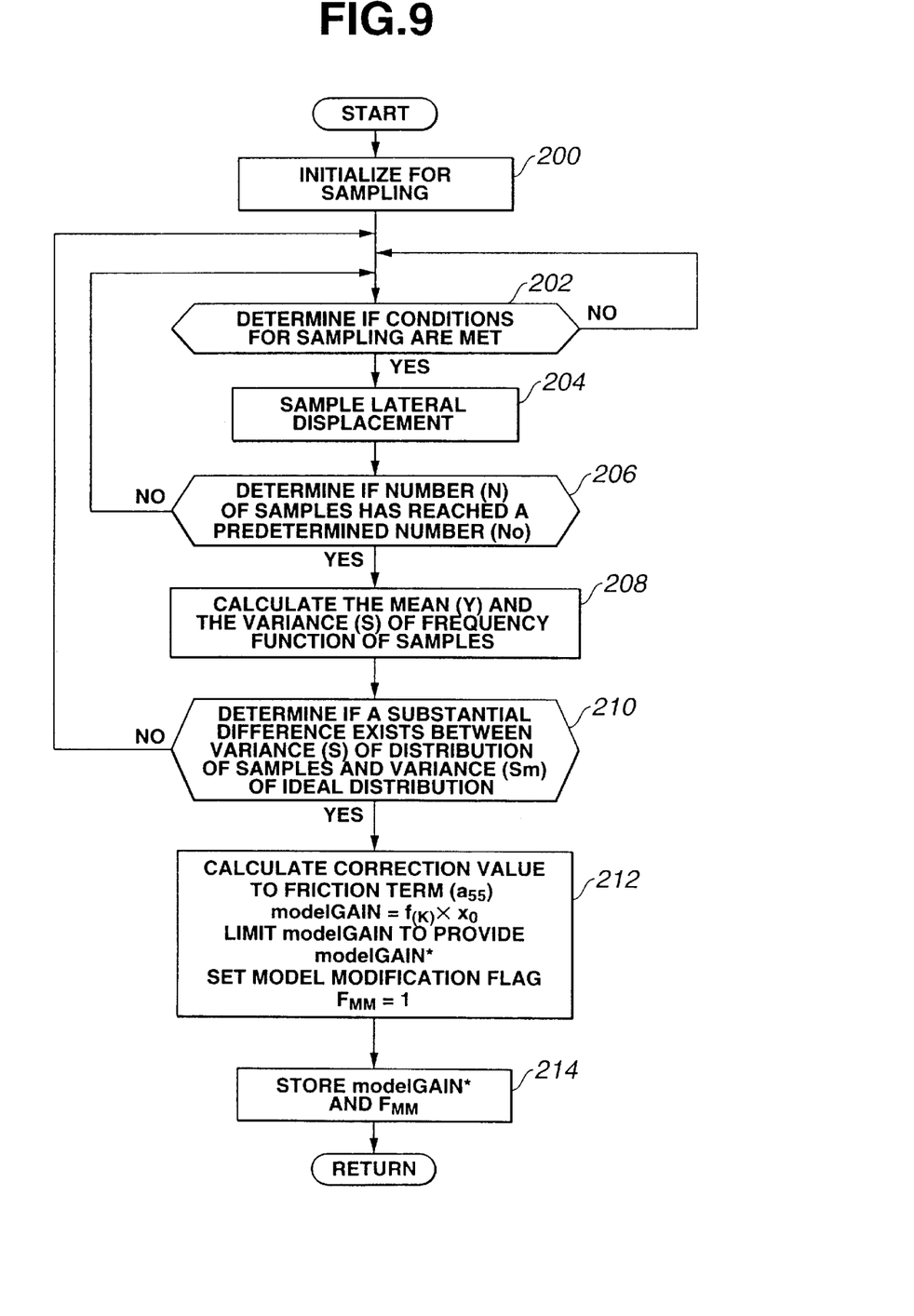
FIG. 9 is a block diagram illustrating a method of the present invention for sampling lateral displacement to calculate a correction value or coefficient.

A block diagram for sampling lateral displacement and calculating a correction value to friction term ($a_{55}$) is set forth in FIG. 9. At block 200, various counter and/or parameters to be used for sampling are initialized. Next, block 202 determines if conditions for sampling are met. The conditions are as follows:

$$V_0 < V < V_1 \qquad 1)$$

where

V represents traveling speed of vehicle;

$V_0$ represents a sampling lower limit speed (70 km/h, for example); and $V_1$ represents a sampling upper limit speed (110 km/h, for example).

$$R < R_0 \qquad 2)$$

where

R represents curvature of a road; and $R_0$ represents a sampling upper limit curvature (300 R, for example).

$$F_{SP} = 0 \qquad 3)$$

where $F_{SP}$, called a sampling prohibit flag, is set ($F_{SP}=1$) if sampling should be prohibited, such as, upon failure of system, upon non-operation of the system, upon interference by driver, or upon operating a direction indicator.

If all of the above-mentioned three conditions are met, at block 202, block 204 samples lateral displacement. At block 204, a counter is incremented to indicate the number (N) of samples collected. Next, block 206 determines if the number N of samples collected has reached a predetermined number $N_0$. If, at block 206, N is less than $N_0$, the process returns to block 202 to continue sampling. If, at block 206, N is equal to $N_0$, the process goes to block 208.

Block 208 calculates the sample mean or average Y and the sample variance S of the real frequency function of the samples. The mean Y can be expressed as:

$$Y = \Sigma Y_i / N_0 \quad \text{Eq. 1.}$$

The variance S can be expressed as:

$$S = \Sigma (Y_i - Y)^2 \quad \text{Eq. 2.}$$

The next block 210 determines if a substantial difference exists between the sample variance S and the variance Sm of the ideal frequency function of lateral displacement data, which has been predetermined. Explaining in detail, using the variances S and Sm, the variance ratio $x_0^2$ between S and Sm ($x_0^2 = S/Sm$) is calculated. At block 210, this variance ratio $x_0^2$ is compared with a first reference $x^2(n-1, 0.05)$ and a second reference $x^2(n-1, 0.95)$. If $x^2$ falls outside of a window defined by $x^2(n-1, 0.05)$ and $x^2(n-1, 0.95)$, block 210 determines that a substantial difference exists between S and Sm. The process goes to block 212. If $x^2$ falls in the window defined by $x^2(n-1, 0.05)$ and $x^2(n-1, 0.95)$, block 210 determines that no substantial difference exists between S and Sm. The process goes to block 202 to continue sampling.

Block 212 calculates a correction value or coefficient (modelGAIN) to friction term $a_{55}$, which can be expressed as:

$$(\text{modelGAIN}) = f(k) \times x_0 \quad \text{Eq. 3.}$$

where f(k) is a function, which may be determined by simulation or experiments; and $x_0$ is a subtraction (S−Sm).

At the same block 212, the determined correction value (modelGAIN) is limited to provide a normalized correction value (modelGAIN*), and a model modification flag $F_{MM}$ is set.

At the next block 214, the normalized correction value (modelGAIN*) and status of flag $F_{MM}$ is stored.

Figure 10:
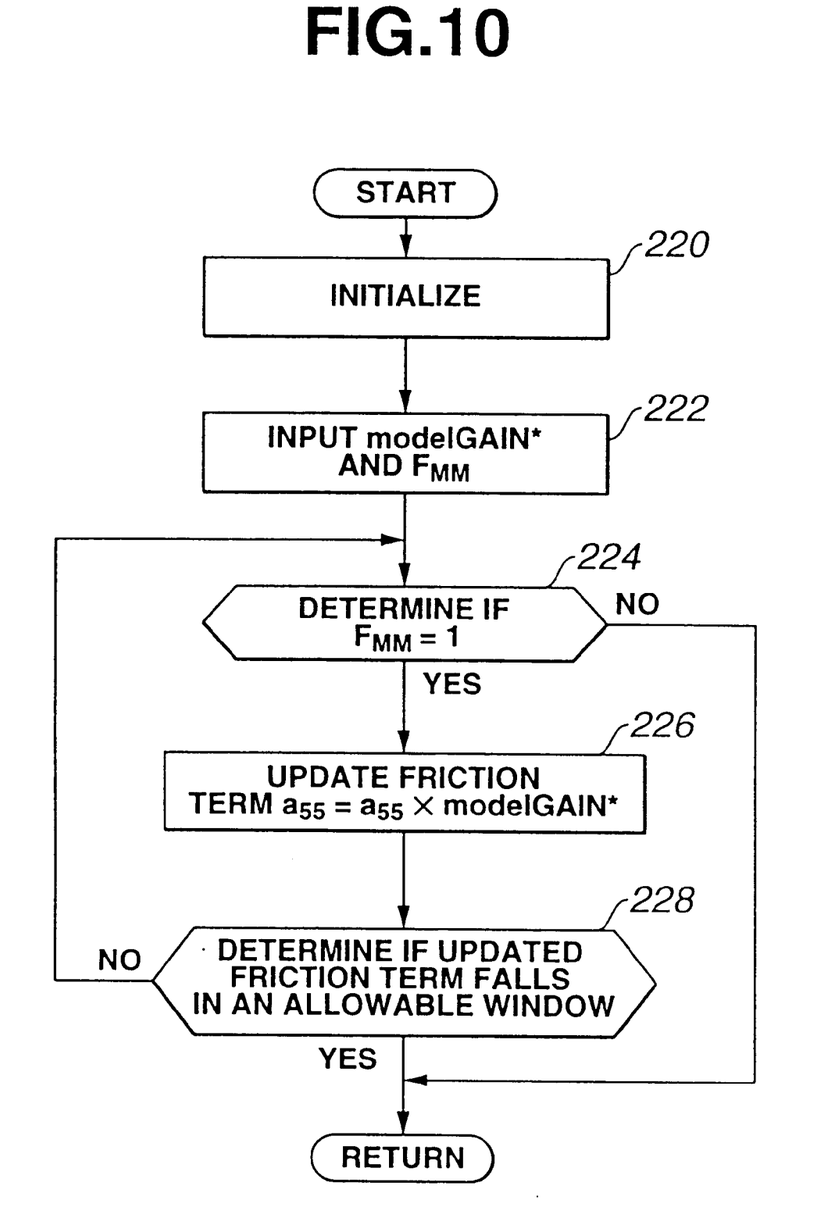
FIG. 10 is a block diagram illustrating a method of the present invention for modifying or updating friction term.

A block diagram for modification of correction value $a_{55}$ isini set forth in FIG. 10. At block 220, necessary data and parameters are initialized. Block 222 inputs the stored normalized correction value (modelGAIN*) and status of flag $F_{MM}$. Next, block 224 determines if flag $F_{MM}$ is set. If this is the cas, the process goes to block 226. If this is not the case, the process goes to "RETURN."

Block 226 modifies or updates friction term $a_{55}$ by calculating the equation as follows:

$$a_{55} = a_{55} \times \text{modelGAIN*} \quad \text{Eq. 4.}$$

The next block 228 determines if the updated friction term falls in an allowable window. If this is the case, the friction term $a_{55}$ is updated with a new value determined at block 226. If this is not the case, the process returns to block 224.

From the preceding description, it is now appreciated that updating friction term ($a_{55}$) provides the advantage that the frequency of adjustment to cope with variation in friction in the steering mechanism has become zero or at least dropped remarkably.

In the embodiment, sampling conditions are established to eliminate collection of samples that might be affected by other than friction in the steering mechanism. The sampling conditions are not limited to the illustrated example.

Sampling technique is not limited to the example set forth in relation to the block diagram shown in FIG. 9. Samples may be collected intermittently or continuously. According to the intermittent sampling technique, the required number of samples is collected to provide a frequency distribution. The collected samples are deleted after the frequency distribution has been obtained. Subsequently, new samples are collected for providing another frequency distribution. According to the continuous sampling technique, samples are collected and stored, continuously, in a shift register having the required number of storing sites. A frequency function is obtained using the stored data in the shift register continuously. Any one of the sampling techniques may be used in embodiments according to the present invention.

In the embodiment, the steering bias in the form of a torque input is used. The torque input may be applied to the steering system as opposed to driver's steering effort. In such case, the level of torque input is decreased as the diver interference increases.

While the present invention has been particularly described, in conjunction with the preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

For further understanding of the background of the present invention, reference is made to Hiroshi Mouri "Study of Automatic Path Tracking Control by Considering Vehicle Dynamics" Doctorial Paper issued by Tokyo Noukou University in March 2001, which is hereby incorporated by reference in its entirety.

This application claims the priority of Japanese Patent Application No. 2000-301818, filed Oct. 2, 2000, the disclosure of which is hereby incorporated by reference in its entirety.

What is claimed is:

1. A method of assisting a driver of a vehicle in tracking a contrived centerline between lane markings defining a lane boundary on a road by applying a steering bias to a steering system of the vehicle, the steering system being provided with an actuator, which provides the steering bias in response to an estimate produced by an observer that has a friction term correlated with friction in the steering system, the method comprising:

establishing an ideal frequency function of lateral displacement data;

sampling lateral displacement of the vehicle in relation to the lane markings to provide a real frequency function of lateral displacement data;

comparing the real frequency function with the ideal frequency function; and updating or leaving unaltered the friction term based on the result of comparison.

2. The method as claimed in claim 1, wherein the value of the friction term is relatively large when the real frequency function provides more distribution than the ideal distribution does, while the value of the friction term is relatively small when the real frequency function provides less distribution than the ideal distribution does.

3. The method as claimed in claim 1, wherein, when there is a standing error between the midpoint of class intervals with the highest frequency of the real frequency function and the contrived centerline position, an input to the observer is modified using the standing error.

4. The method as claimed in claim 1, wherein sampling conditions under which the step of sampling is performed are when traveling speed of the vehicle falls in a window defined by sampling lower limit speed and a sampling upper limit speed, and when curvature of the road is less than a sampling upper limit curvature.

5. A driver assistance system for a vehicle adapted to assist a driver in tracking a contrived centerline between lane markings defining a lane boundary on a road by applying a steering bias to a steering system of the vehicle, the steering system being provided with an actuator, which provides the steering bias in response to an estimate produced by an observer that has a friction term correlated with friction in the steering system, the system comprising:

a lane recognition unit providing a lateral displacement of the vehicle in relation to the lane markings;

a controller; and a computer readable storage media having data representing instructions executable by the controller, the computer readable storage media having:

instructions for establishing an ideal frequency function of lateral displacement data;

instructions for sampling the lateral displacement of the vehicle in relation to the lane markings to provide a real frequency function of lateral displacement data;

instructions for comparing the real frequency function with the ideal frequency function; and instructions for updating or leaving unaltered the friction term based on the result of comparison.

6. A vehicle installed with the driver assistance system as claimed in claim 5.

7. A driver assistance system for a vehicle adapted to assist a driver in tracking a contrived centerline between lane markings defining a lane boundary on a road by applying a steering bias to a steering system of the vehicle, the steering system being provided with an actuator, which provides the steering bias in response to an estimate produced by an observer that has a friction term correlated with friction in the steering system, the system comprising:

means for providing a lateral displacement of the vehicle in relation to the lane markings; and a controller means for executing:

instructions for establishing an ideal frequency function of lateral displacement data;

instructions for sampling the lateral displacement of the vehicle in relation to the lane markings to provide a real frequency function of lateral displacement data;

instructions for comparing the real frequency function with the ideal frequency function; and instructions for updating or leaving unaltered the friction term based on the result of comparison.

\* \* \* \* \*